Sept. 13, 1966  A. L. JOHNSON  3,272,218
PRESSURE ACTUATED VALVE
Filed Feb. 12, 1963  2 Sheets-Sheet 1
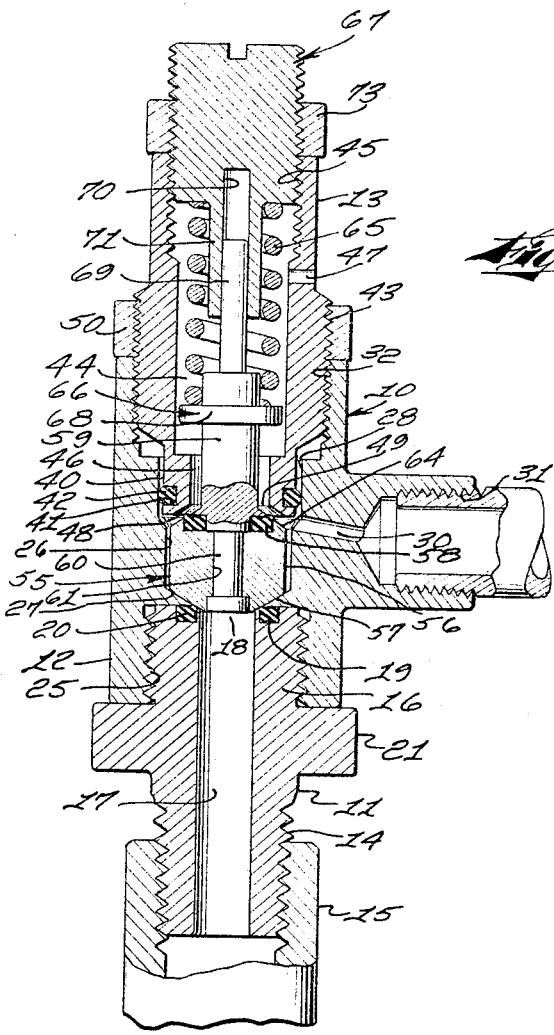
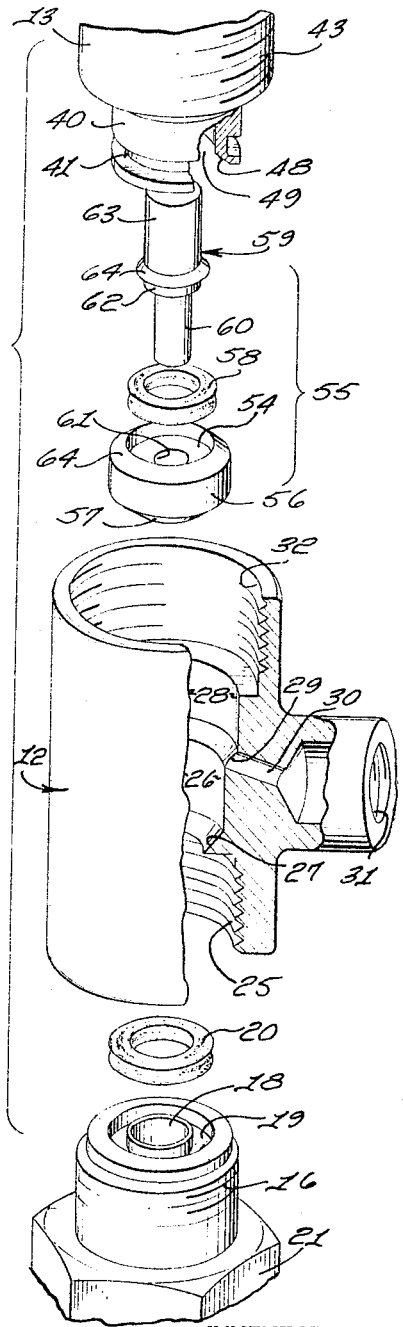
INVENTOR.
ARTHUR L. JOHNSON
BY FOWLER & KNOBBE
ATTORNEYS

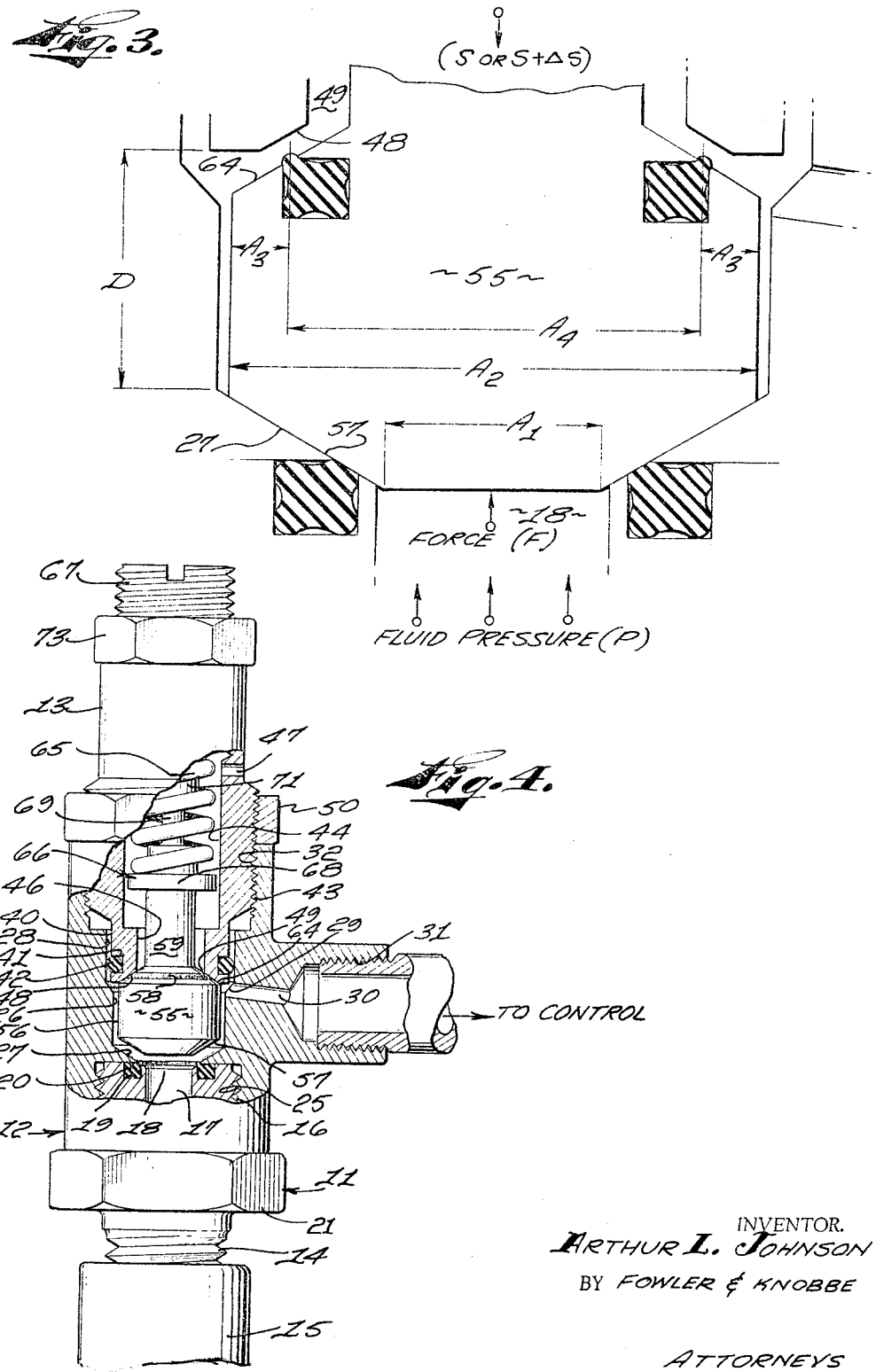

United States Patent Office 3,272,218
Patented Sept. 13, 1966

3,272,218
PRESSURE ACTUATED VALVE
Arthur L. Johnson, El Monte, Calif., assignor to
F. C. Kingston Co., Los Angeles, Calif.
Filed Feb. 12, 1963, Ser. No. 257,956
5 Claims. (Cl. 137—102)

This invention relates to a fluid pressure actuated valve, and, more particularly, to an improved spring biased valve of this type.

Pressure actuated valves are required in numerous applications such as, for example, the maintenance of a predetermined pressure within a reservoir tank. For this application, the inlet port of the valve is in communication with the reservoir pressure and the outlet valve port is connected in driving engagement with the prime mover which maintains the reservoir pressure. Typically, the outlet port is connected to a clutch which in turn is connected between a motor and a compressor, a first actuating pressure causing the valve to engage the clutch and thereby disconnect the compressor from the motor and a second lower release pressure causing the valve to disengage the clutch so as to increase the pressure to its desired value. The differential pressure for a pressure actuated valve is defined as the difference between the actuating and release pressure values. In the application described, a large differential pressure is undesirable since it allows the pressure in the reservoir to drop substantially below the desired value before reconnecting the compressor to the motor. Another requirement for this application is that the valve have a very fast response actuation so that the clutch is either totally engaged or totally disengaged. Unless there is this rapid valve actuation, the clutch mechanism will remain partially engaged for an appreciable period of time thereby causing deleterious wear thereof.

The prior art ball valve enjoys substantial contemporary usage in applications such as the one described above. This valve comprises a valve member having formed therein a hollow interior cavity in which a spherical member seals one or more port means communicating with the cavity. The ball is urged against one of the ports by means such as a compression spring and is caused to move within the cavity when sufficient pressure is applied to this port.

The ball valve is suitable for many applications but has a serious deficiency when the same valve must be used with a wide range of operating pressures. A characteristic of this valve is that increasing fluid inlet pressures cause an increase in its differential pressure. Heretofore, these valves have been only useful over a very limited range of pressures. In order to maintain the same differential pressure for a different range of pressures it has been necessary to disassemble the valve and substitute a spring of different rate. For example, four or five different spring rates are required to maintain a low differential pressure over a range of pressures from 40 to 440 p.s.i.

Accordingly, it is an object of the present invention to provide an improved pressure actuated valve which maintains a preselected moderate differential pressure over a wide range of operating pressures.

It is a further object of this invention to provide an improved spring biased pressure actuated valve wherein a single spring rate enables operation over a wide range of pressures.

It is a further object of the invention to provide a pressure actuated valve which has a very fast action.

Another object of this invention is to provide an improved pressure actuated valve which is easily manufactured and assembled.

Other and further objects, features and advantages of the invention will become apparent as the description proceeds.

Briefly, in accordance with a preferred form of the present invention, there is provided a valve body having formed therein a cylindrically shaped interior cavity. This hollow interior includes first and second ports located at respective ends of said interior cavity and first and second valve seats respectively circumscribing these ports. A third port is also in communication with the interior cavity and each of the ports is in communication with the outside of the valve housing by means of respective passageways therethrough. A cylindrically shaped plunger having valve faces at its respective ends is axially mounted within the hollow interior so that these valve faces are juxtaposed the first and second valve seats of said interior. This plunger has a slightly smaller diameter than the hollow interior so as to thereby form a relatively long fluid restriction path within the valve. A compression spring mounted between the valve body and the plunger urges one of the valve faces against its corresponding valve seat.

Valves so constructed provide a solution to the problem of increased pressure differential with increased operational pressures by providing a substantial fluid restriction path and resultant pressure differential across the valve. A relatively long stroke for the plunger is provided thereby and as a result, the bias spring is given a correspondingly large deformation. The additional force produced by this spring deformation acts to force the plunger in the opposite direction when the inlet pressure decreases a small value, thereby maintaining the desired moderate differential pressure regardless of operating pressures.

Another feature of the valves constructed according to this invention involves forming the valve faces and valve seats of the plunger and cavity respectively in a particular configuration so as to obtain a fast acting, snap action device whereby the outlet port may be connected to either of two other ports with a minimum of time delay. This action is very important in certain applications such as the clutch driving embodiment noted above.

A more thorough understanding of the invention may be obtained by a study of the following detailed description taken in connection with accompanying drawings in which:

FIG. 1 illustrates a longitudinal cross-section of a pressure actuated valve constructed according to the present invention;

FIG. 2 is an exploded perspective view of a portion of the valve shown in FIG. 1;

FIG. 3 is an enlarged view of the valve plunger and interior cavity of the valve for facilitating an understanding of the valve operation; and FIG. 4 is another view of the valve partially in cross-section illustrating the valve actuation when the inlet pressure exceeds a predetermined valve actuating pressure.

Referring now to the figures and particularly to FIGS. 1 and 2, the pressure actuated valve 10 includes a valve body comprising base member 11, central member 12 and upper member 13. Base member 11 includes an externally threaded cylindrical fitting 14 for engagement with the inlet pressure source 15, another externally threaded cylindrical fitting 16 for engagement with the central body member 12, and through bore 17 terminating in port 18. An annular groove 19 circumscribes port 18 and retains an elastic sealing quad ring 20. This ring is preferably made from a synthetic material such as neoprene, a form of synthetic rubber. Seals made from this material can be produced to quite close limits of accuracy, and the material is available in a number of degrees of hardness. Synthetic sealing materials including silicones in their composition are available for higher maximum working temperatures. Base member 11 is completed by the hexagonally shaped portion 21 located between the threaded fittings 14 and 16 for facilitating tightly fastening base member 11 to the central body member 12.

Central body member 12 includes a threaded opening 25 for engagement with base member 11 and a generally cylindrical cavity 26 located between frusto-conical portion 27 and a diametrically enlarged portion 28. A side port 29 is located proximate the upper edge of cylindrical cavity 26 and is connected to a passageway 30 communicating with threaded opening 31. Another threaded opening 32 is included at the upper end of central body member 12 for engagement with the upper body member 13.

The upper body member 13 of the valve housing includes a cylindrical portion 40 somewhat smaller than portion 28 of the central body portion, the former including an annular groove 41 in its peripheral surface and an elastic sealing "O" ring 42 retained therein for providing a fluid tight seal between these members. Integral with and above cylindrical portion 40 is an externally threaded portion 43 for engaging threaded opening 32 of the central body portion. Locking nut 50 maintains upper body member 13 in a preselected position relative central body member 12.

A cylindrical chamber 44 is formed within the upper body member 13, this chamber terminating at its upper end in threaded opening 45 and at its lower end in a diametrically decreased portion 46. A bleed orifice 47 connects chamber 44 with the exterior of the valve housing. On the bottom of member 13 is formed a frusto-conical surface 48 circumscribing a port 49 communicating with chamber 44.

A plunger 55 is retained within the cylindrical chamber 26 of central body member 12 and includes a cylindrical portion 56 having a slightly smaller diameter than the chamber 26. A representative gap between the interior wall of chamber 26 and exterior wall 56 of the plunger is .003 inch, this gap being maintained throughout the complete circumference and length of the plunger. The bottom of the plunger member 55 includes a frusto-conical surface 57 corresponding to the frusto-conical surface 27 of central body member 12. The top of member 55 includes a shallow cylindrical chamber 54 which retains a quad elastic sealing ring 58 having a construction similar to that of sealing ring 20. The plunger further includes member 59 having a cylindrical shank 60 pressfit in bore 61 of member 56, integral ring 62 retaining sealing ring 58, and upper cylindrical portion 63 extending into chamber 44 of the upper valve body member 13. The upper side of ring 62 and the upper surface of plunger member 56 form a frusto-conical surface 64 corresponding to the frusto-conical surface 48 of upper body member 13.

It will be seen that plunger 55 includes first and second frusto-conical surfaces 57, 64 forming respective valve faces juxtaposed respective valve seats 27, 48 formed at respective ends of the cylindrical chamber 26 and respectively circumscribing ports 18 and 49 thereof. These valves provide essentially metal-to-metal contact surfaces, the sealing rings 20 and 58 being included to insure a fluid tight seal. A particular advantage of the structure shown is that only a small portion of each elastic seal need be exposed to the respective valve face upon the plunger. This eliminates or substantially reduces the sticking of the sealing ring to the valve face since little removal force is required when such a small portion of the elastic seal is in contact with the surface of the plunger.

The plunger valve face 57 is urged against valve seat 27 by a compression spring 65 (FIG. 1) which engages at opposite ends spring guide member 66 and pressure responsive selector member 67. Spring guide member 66 comprises a diametrically enlarged portion 68 upon which rests one end of spring 65 and a reduced elongated shaft portion 69 which is mounted for axial movement in a vertical bore 70 formed in a downwardly extending portion 71 of the pressure selector member 67. This latter member supports the other end of spring 65 and is threadedly accommodated in opening 45 of the upper body member 13. Locking nut 73 maintains member 67 in a preselected position.

The operation of the valve described hereinabove is as follows: cylindrical fitting 14 is coupled to a source of input fluid under pressure and threaded outlet opening 31 is attached to a pressure controlled member. At a predetermined fluid input pressure (determined by the position of pressure selector member 67 relative the upper body member 13), the plunger 55 is translated upwardly against the force supplied by compression spring 65. At such time, for reasons explained below, the plunger quickly operates in essentially a snap type action to seat valve face 64 against valve seat 48. Outlet opening 31 is then in communication with the inlet fluid pressure via passageway 30, the gap provided between plunger 55 and cavity 26, the then open port 18, and bore 17. When the inlet pressure decreases to a predetermined release pressure (determined by the position of the upper body member 13 relative the central body member 12), the force applied by spring 65 causes plunger 55 to reseat its lower face 57 against valve seat 27. Outlet 31 is then in communication with the outside of valve 10 via the then open port 49, decreased diameter portion 46 of chamber 44 and bleed orifice 47 of the upper valve member 13.

The difference in pressure between the pressure which actuates the plunger 55 and the release pressure which allows the compression spring to translate the plunger is defined as the differential pressure. A significant advantage of the valve described hereinabove is that it provides a preselected moderate differential pressure over a wide range of operating pressures. For example, valves constructed according to the present invention maintain a differential pressure not exceeding 16 p.s.i. over a wide range of inlet pressures, e.g., 40 to 440 p.s.i. The reasons for this greatly improved operation over the prior art ball valve are best illustrated by FIG. 3. As shown therein, upward force F is applied plunger 55 by the fluid pressure P and a downward force S or $S+\Delta S$ is applied plunger 55 by the compression spring 65. S represents the force applied by the spring when the plunger is in the position illustrated in FIGS. 1 and 3 with port 18 closed. The value of F must of course be somewhat larger than S in order to cause axial translation of plunger 55. The value of S may be varied by unloosening locking nut 73 and rotating pressure selector member 67 so as to change the compression of spring 65 and effect a corresponding change in the value of S.

$\Delta S$ is the additional force supplied by further compression of spring 65 caused by upward movement of plunger 55. It will be apparent that the value of $\Delta S$ varies according to the distance travelled by plunger 55. This distance is made selectively variable by unloosening locking nut 50 and rotating the upper body member 13 relative the central body member 12 to either increase or decrease the distance D between the upper and lower valve seats 48 and 27. A particular advantage of the present invention is that the distance D may be made relatively large thus increasing the magnitude of the force $\Delta S$. This is so because of the relatively long fluid restriction path provided between the wall of cylindrical cavity 26 and the cylindrical plunger 55. This construction enables plunger 55 to be lifted by fluid pressure for a distance of more than 0.125 inch whereas the prior art ball valves with their much smaller restriction path provide a maximum lift of approximately 0.02 inch. An increased value of $\Delta S$ is particularly important when using the valve with high operating pressures producing a substantially high upward force F. Under these conditions, if, as in the ball type valve, the spring force does not increase accordingly, the applied fluid pressure must decrease substantially before the plunger is urged downwardly by the forces $S+\Delta S$. Contrarywise, in the present invention, the spring force does increase substantially because of the $\Delta S$ component; the differential pressure may thus be maintained in a moderate value even under substantially increased input pressures.

Side port 29 has a relatively small diameter in order to preserve the fluid restriction path provided by cylindrical plunger 55 and cylindrical cavity 26. This port is also located at the upper end of cavity 26 nearest outlet port 49 so that fluid pressure between side port 29 and outlet 49 is not obstructed when compression spring 65 causes plunger 55 to translate against valve seat 27.

The fast action afforded plunger 55 by the valve of this invention is obtained in the following manner. Again, referring to FIG. 3, the initial force applied to plunger 55 is the result of the input fluid pressure acting only against the area $A_1$, whereas immediately after the plunger face 57 is unseated from valve seats 27, the fluid pressure acts upon the larger area $A_2$. The increased force caused by this area increase results in a very rapid translation of the plunger 55 thereby providing the desired snap-type actuation. After the valve face 64 is seated against valve seat 48, the fluid pressure contributes a downward component acting upon area $A_3$; accordingly, the resultant force when the plunger 55 is in the position of FIG. 4 is substantially equal to the inlet pressure P multiplied by the area $A_4$ or $PA_4$. The snap action for the opposite translation of plunger 55 is afforded by the back pressure of the fluid emitted from side port 29 against valve face 64 when the plunger 55 is unseated from port 49. This fluid flows through port 49 to the outside of valve 10 via bleed orifice 47.

The fast action of the present invention in both the actuating and release operating modes is especially desirable in the application noted above wherein the outlet of the valve controls a fluid pressure responsive clutch since the clutch mechanism is subjected to deliterious wear unless positively engaged and disengaged by rapid application and removal of the control pressures.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:
1. A fluid pressure actuated valve having:
   a valve body comprising
      a base member including
         a first externally threaded cylindrical fitting for engagement with an inlet pressure source, a second externally threaded cylindrical fitting, a through bore terminating in a port, an annular groove circumscribing said port, and an elastic sealing ring retained in said groove;
      a central body member including
         a first threaded opening for engagement with said second externally threaded cylindrical fitting of said base member and having formed therein a generally cylindrical cavity located between a frusto-conical portion at one end and a diametrically enlarged portion at the other end and having a side port located proximate said latter cavity end connected to a passageway communicating with a threaded outlet opening, said central body member also including another threaded opening oppositely disposed from said first threaded opening; and
      an upper body member including
         an outwardly threaded portion disposed between a cylindrical portion located within said diametrically enlarged portion of said central body member and a threaded opening which engages a pressure selector member, means for providing a seal between the diametrically enlarged portion of said central body member and said cylindrical portion of said upper valve body member, and a frusto-conical valve seat formed at one end of said upper body member oppositely disposed from the frusto-conical surface of said central body member, said valve seat circumscribing a port which is in communication with a bleed orifice formed in said upper body member;
   a plunger comprising
      a generally cylindrical member located within the generally cylindrical cavity of said central body member and having first and second frusto-conically shaped valve faces mating with said frusto-conical valve seats formed by said central and said upper body members, said plunger including a resilient seating member disposed in said face juxtaposed the frusto-conical valve seat formed by said upper body member; and
   a compression spring located within said upper valve body member between a guide member and said pressure selector member, said guide member being coupled to said plunger whereby said plunger is urged to seat against the frusto-conical valve seat formed by said central body member.

2. A fluid pressure actuated valve which maintains a pre-selected moderate differential pressure when connected to a wide range of fluid pressures, said valve comprising a valve housing including
   a central body member having formed therein a hollow generally cylindrical cavity and a first port and associated valve seat formed at one end of said cavity,
   an upper body member extending into said central body member and threadably engaged therewith and forming a second valve seat, said portion of said upper body member extending into said central body member including a peripheral annular groove,
   an additional port in communication with said cavity, and
   an elastic sealing ring retained in said groove for providing a seal between said upper and central body members,
   whereby the distance between said first and second valve seats may be varied by rotating the upper body member relative said central body member;
a plunger having a cylindrical portion and valve face at one end thereof mounted for axial movement within said cylindrical cavity, with said valve face justaposed said first valve seat, a space being provided between said plunger and the walls of said cylindrical cavity for forming a relatively long fluid restriction path; and
means for urging said plunger to sealingly engage said valve seat.

3. A fluid pressure actuated valve which maintains a pre-selected moderate differential pressure when connected to a wide range of fluid pressures, said valve comprising
   a valve housing having a hollow generally cylindrical interior, a first port and associated valve seat formed at one end of said cavity and a second port and associated valve seat at the end of said cavity opposite said first port, said housing including an additional port in communication with said cavity;
   means for selectively varying the distance between said first and second valve seats so that the differential operating pressure of said valve may be varied;
   a plunger having a cylindrical portion and respective valve faces at opposite ends thereof mounted for actual movement within said cylindrical cavity, with one of said valve faces juxtaposed said first valve seat and the other valve face juxtaposed said second valve seat, a space being provided between said plunger and the walls of said cylindrical cavity forming a relatively long fluid restriction path; and means for urging said plunger to sealingly engage said first valve seat.

4. A fluid pressure actuated valve which maintains a preselected moderate differential pressure when connected to a wide range of fluid pressures, said valve comprising:
a valve housing including
a first body member having formed therein a hollow elongate cavity,
a first port and associated valve seat at one end of said cavity,
a second body member threadably engaged with said first body member and forming a second valve seat at the other end of said cavity whereby the distance between said first and second valve seats and the differential pressure may be varied by rotating the second body member relative to said first body member,
an additional port in communication with said cavity, and
means for providing a seal between said first and second body members;
a valve member mounted for axial movement within said cylindrical cavity between a first position in which said valve member sealingly engages said first valve seat and a second position in which said valve member sealingly engages said second valve seat; and,
means for urging said valve member to said first position.

5. A fluid pressure actuated valve which maintains a preselected moderate differential pressure when connected to a wide range of fluid pressures, said valve comprising:
a valve housing having a hollow generally cylindrical interior;
a first port and associated valve seat at one end of said cavity;
a second port and associated valve seat at the other end of said cavity;
a third port in communication with said cavity;
means for selectively varying the distance between said first and second valve seats so that the differential operating pressure of said valve may be varied;
a valve member mounted for axial movement within said cylindrical cavity between a first position in which said valve member sealingly engages said first valve seat and a second position in which said valve member sealingly engages said second valve seat; and,
means for urging said valve member to said first position.

References Cited by the Examiner

UNITED STATES PATENTS

| | | | |
|---|---|---|---|
| 831,677 | 9/1906 | Noone | 137—625.27 X |
| 1,854,709 | 4/1932 | Mathieson | 137—469 X |
| 2,282,188 | 5/1942 | Horne | 137—218 |
| 2,417,494 | 3/1947 | Hoof | 251—332 |
| 2,959,188 | 11/1960 | Kepner | 251—332 X |
| 3,107,893 | 10/1963 | Bashe | 251—332 X |

FOREIGN PATENTS 1,125,604  7/1956  France.

WILLIAM F. O'DEA, *Primary Examiner.*

ISADOR WEIL, *Examiner.*

D. LAMBERT, *Assistant Examiner.*